(12) United States Patent
Takehana et al.

(10) Patent No.: US 9,885,943 B2
(45) Date of Patent: Feb. 6, 2018

(54) PROJECTION LENS AND PROJECTOR

(71) Applicant: SEIKO EPSON CORPORATION, Tokyo (JP)

(72) Inventors: Naoto Takehana, Matsumoto (JP); Nobutaka Minefuji, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/612,632

(22) Filed: Jun. 2, 2017

(65) Prior Publication Data

US 2017/0357147 A1  Dec. 14, 2017

(30) Foreign Application Priority Data

Jun. 10, 2016  (JP) ................................ 2016-115968

(51) Int. Cl.
*G03B 21/14* (2006.01)
*H04N 9/31* (2006.01)
*G02B 13/16* (2006.01)
*G03B 21/00* (2006.01)
*G03B 21/20* (2006.01)
*G03B 21/10* (2006.01)
*G02B 13/18* (2006.01)

(52) U.S. Cl.
CPC .......... *G03B 21/005* (2013.01); *G02B 13/16* (2013.01); *G02B 13/18* (2013.01); *G03B 21/10* (2013.01); *G03B 21/142* (2013.01); *G03B 21/208* (2013.01); *H04N 9/317* (2013.01); *H04N 9/3114* (2013.01)

(58) Field of Classification Search
CPC .... G03B 21/147; G03B 21/14; G03B 21/142; H04N 9/3141; H04N 9/317; G02B 13/22; G02B 13/18; G02B 13/04
USPC .................... 353/97, 100; 359/649, 650, 651
See application file for complete search history.

(56) References Cited

U.S. PATENT DOCUMENTS 7,855,840 B2     12/2010  Minefuji
2009/0195884 A1*  8/2009  Inoko .................... G02B 13/22
                                                   359/682

FOREIGN PATENT DOCUMENTS

JP       2013-148930 A      8/2013

\* cited by examiner

*Primary Examiner* — Ryan Howard
(74) *Attorney, Agent, or Firm* — Oliff PLC

(57) ABSTRACT

A projector used a projection lens to enlarge and project image light generated by image generator. When it is assumed that the on-optical-axis position of a lens surface where the maximum of light ray passage ranges (effective diameter) is minimized in the projection lens is a minimum diameter position, a stop is provided on a lens shifted from the minimum diameter position toward the light exiting side. The lens on which the stop is provided is a lens (for example, fourth lens closest to minimum diameter position) that satisfies $0.8\varphi_1 \leq \varphi_2 \leq \varphi_1$, where $\varphi_1$ represents the light flux diameter on a surface where the on-axis light flux diameter is maximized, and $\varphi_2$ is the diameter of the stop.

14 Claims, 6 Drawing Sheets

PROJECTION LENS AND PROJECTOR

BACKGROUND

1. Technical Field

The present invention relates to a projection lens that projects an image and the like on a screen and a projector including the projection lens.

2. Related Art

A projector that enlarges and projects an image generated by using a liquid crystal light valve, a digital micromirror device (DMD), or any other device via a projection lens on a screen has been used and is currently used. JP-A-2013-148930 discloses a projection lens (projection zoom lens) used in a projector of the kind described above. FIG. 9 is a cross-sectional configuration diagram of lens groups that form the projection lens of related art. The projection lens shown in FIG. 9 is disclosed in JP-A-2013-148930.

The projection lens disclosed in JP-A-2013-148930 has a first lens group G1, a second lens group G2, a third lens group G3, a fourth lens group G4, and a fifth lens group G5 sequentially arranged from the image magnifying side. The first lens group G1 and the second lens group G2 form a first combined lens group, and the third lens group G3 and the fourth lens group G4 form a second combined lens group. The magnification factor of a projected image is changed by changing the distance between the combined lens groups. Further the spherical aberrations, comma, and astigmatism produced when the magnification factor is changed are corrected by changing the distance between the first lens group G1 and the second lens group G2 and the distance between the third lens group G3 and the fourth lens group G4.

The projection lens disclosed in JP-A-2013-148930 includes an aperture stop 100, which controls the amount of light passing therethrough, as shown in FIG. 9. The provided aperture stop 100 controls the brightness of a projected image. Further, blocking unnecessary light rays by using the aperture stop 100 suppresses a decrease in the quality of a projected image. In the projection lens shown in FIG. 9, the aperture stop 100 is disposed in a position where the light flux diameter is minimized.

In the projection lens, the position where the light flux diameter is small is the position where illumination light converges. Providing the aperture stop 100 in the position possibly causes an increase in the temperature of the aperture stop 100. When the temperature in a member in the vicinity of the aperture stop increases, the member thermally expands, resulting in a decrease in performance of the projection lens. Further, the member heated to a high temperature, such as a lens frame, may melt, causing the projection lens to achieve no resolution. To avoid such a situation, the aperture stop 100 and the member disposed in the vicinity thereof need to be made of a heat-resistant material. For example, a metal frame, such as a part formed of a metal sheet and formed in a drawing process, is used. Use of a heat-resistant member, however, results in an increase in cost.

SUMMARY

An advantage of some aspects of the invention is to suppress a decrease in lens performance due to high temperature and reduce cost in a projection lens including a stop.

An aspect of the invention is directed to a projection lens including a plurality of lenses arranged along an optical axis. When it is assumed that the side where light exits from the projection lens is a light exiting side, that the side opposite the light exiting side is a light incident side, that the maximum of light ray passage ranges of lens surfaces is an effective diameter, and that the on-optical-axis position of a surface where the effective diameter is minimized is a minimum diameter position, a stop is formed along the outer circumferential edge of a specific lens located not only in a position shifted from the minimum diameter position toward the light exiting side and but also in a position where the light flux is expanded to some extent.

That is, the aspect of the invention is directed to a projection lens including a plurality of lenses arranged along an optical axis, wherein when it is assumed that a side where light exits from the projection lens is a light exiting side, that a side opposite the light exiting side is a light incident side, that a maximum of light ray passage ranges of lens surfaces is an effective diameter, and that an on-optical-axis position of a surface where the effective diameter is minimized is a minimum diameter position, an on-axis light flux diameter on the light exiting side is smaller than the minimum effective diameter, and a stop that controls the on-axis light flux diameter is formed along an outer circumferential edge of a specific lens that satisfies the following expression (1):

$$0.8\varphi_1 \leq \varphi_2 \leq \varphi_1 \qquad \text{Expression (1)}$$

where $\varphi_1$ represents a light flux diameter on a surface where the on-axis light flux diameter is maximized, and $\varphi_2$ is the diameter of the stop that controls the on-axis light flux passing through a lens shifted from the minimum diameter position toward the light exiting side.

In the projection lens according to the aspect of the invention, a lens shifted from the minimum diameter position toward the light exiting side is provided with a stop. The lens provided with the stop is a lens located in a position and having a diameter that allow the diameter $\varphi_2$ of the stop formed on the lens to be a value 0.8 to 1.0 times the light flux diameter $\varphi_1$ in a plane where the on-axis light flux diameter is maximized. Providing the lens itself with a portion that functions as the stop eliminates the need to use a stop formed of a separate member. Further, since high temperature will not be likely to occur in the position where light converges or in the position of the stop, the possibility of a decrease in lens performance and damage of a lens frame and other components due to high temperatures decreases. Further, no heat-resistant member needs to be used. Therefore, in the projection lens including the stop, a decrease in lens performance due to a high temperature can be suppressed, and cost reduction can be achieved. Moreover, in a case where the diameters of the lenses shifted from the minimum diameter position toward the light exiting side differ from one another by a small value, providing the portion that functions as the stop on a lens located in a position where the light flux diameter has a large value, such as the value expressed by Expression (1), allows heat dissipation capability to increase to prevent the stop and components therearound from being heated to high temperatures.

In the aspect of the invention, it is preferable that the stop is a rough surface provided on a surface of a lens base material constituting the specific lens. Since light incident on the rough surface is diffused, the light that passes through the stop can be controlled. The stop can therefore be provided by using a simple structure. Further, since the light is diffused, an increase in the temperature due to absorption of the light can be reduced. The possibility of a decrease in lens performance and damage of the lens frame and other components due to high temperatures therefore decreases.

In the aspect of the invention, it is preferable that the specific lens is a cemented lens formed of a lens located on the light exiting side and a lens located on the light incident side with the two lenses bonded to each other, that one of the lens located on the light exiting side and the lens located on the light incident side has a first bonding surface facing the other lens, that the first bonding surface has a first bonding region bonded to the other lens, and that the region outside the circumference of the first bonding region of the first bonding surface is the rough surface. In the configuration described above, the stop can be formed by using the bonding surface of one of the lenses that form the cemented lens.

In the aspect of the invention, it is preferable that the first bonding surface is a non-smoothly-continuous surface that bends at a boundary of the first bonding region and the rough surface. In the configuration described above, since the boundary between the first bonding region and the rough surface determines the diameter of the stop, the possibility of variation in the diameter of the stop, due to influence of positional precision of the two lenses bonded to each other, decreases.

In the aspect of the invention, a groove that is recessed toward an inner circumference of the specific lens may be formed along an entire circumference of an outer circumferential surface of the specific lens, and the rough surface may be provided on an inner circumferential surface of the groove. The configuration described above allows the stop to be provided even on a lens that is not a cemented lens.

In the aspect of the invention, it is preferable that $\varphi_2 \geq 1.2\varphi_3$ is satisfied, where $\varphi_3$ represents the light flux diameter in the minimum diameter position. In the configuration described above, since the stop is disposed in a position which is remote from the minimum diameter position and where the light is expanded by a greater amount than in the minimum diameter position, the lens on which the stop is provided and a lens frame that holds the lens are unlikely to be heated to high temperatures. When the light flux diameter is expanded by a factor of at least 1.2, the area of the stop on which the light is incident is increased by a factor of at least two, whereby the possibility of a decrease in lens performance and damage of the lens frame and other components due to high temperatures decreases.

In the aspect of the invention, it is preferable that $D \geq \varphi_3$ Expression is satisfied, where $\varphi_3$ represents the light flux diameter in the minimum diameter position, and D represents a distance between the minimum diameter position and the stop along the optical axis. In the configuration described above, the stop is separate from the minimum diameter position, where a high temperature is likely to occur. Therefore, a configuration capable of controlling light passage is achieved, and the possibility of a decrease in lens performance and damage of members decreases.

A projector according to another aspect of the invention includes any of the projection lenses described above and an image generator that generates image light incident on the projection lens.

The projector according to the aspect of the invention includes any of the projection lenses described above. Therefore, a configuration having a stop that controls the amount of light to be projected and further controls off-axis light rays is achieved, and a decrease in lens performance of the projection lens due to a high temperature can be avoided. The projector can therefore suppress a decrease in quality of a projected image and the like and can achieve reduction in the number of members of the projection lens and cost reduction thereof.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of a projector using a projection lens to which the invention is applied will be described below with reference to the drawings.

Overall Configuration

Figure 1:
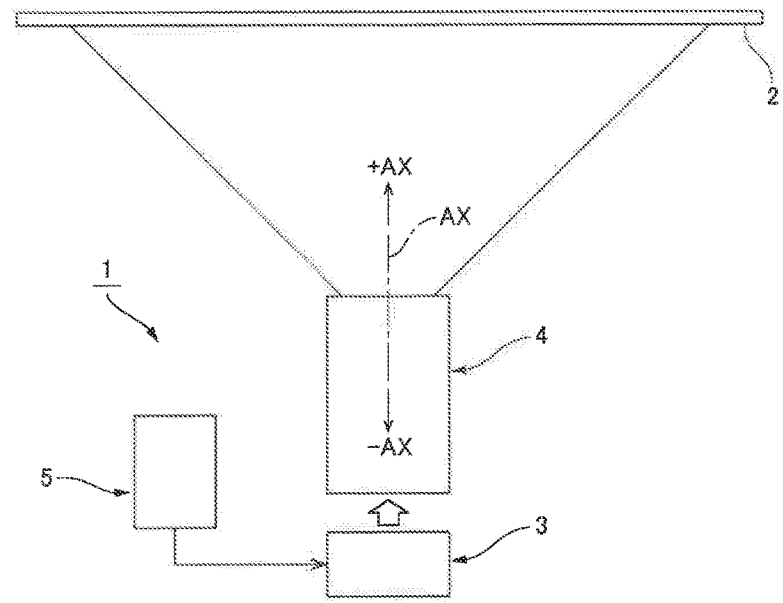
FIG. 1 is a descriptive view diagrammatically showing a schematic configuration of a projector to which the invention is applied.

FIG. 1 is a descriptive view diagrammatically showing a schematic configuration of a projector 1 to which the invention is applied. The projector 1 projects an image and the like on a screen 2. The projector 1 includes an image generator 3, a projection lens 4, and a controller 5. The mechanisms described above are accommodated in an exterior enclosure that is not shown. The image generator 3 and the projection lens 4 are accommodated in the exterior enclosure with roughly the entire image generator 3 and projection lens 4 covered with a light guide that is not shown but blocks light.

The image generator 3 includes a light source and a spatial light modulator that uses light from the light source to generate image light. The light source can, for example, be an LED. In a case where R, G, and B three color light fluxes are combined with one another to form the image light, R, G and B three color LEDs are used as the light source. The spatial light modulator includes liquid crystal panels 31 corresponding to the color LEDs and a cross dichroic prism 32, on which light fluxes from the liquid crystal panels are incident in different direction (see FIG. 3). The light fluxes from the three color LEDs are incident on the corresponding liquid crystal panels. Each of the liquid crystal panels 31 modulates the light from the light source (LEDs) in accordance with an image signal and outputs the modulated light. The R light, G light, and B light outputted from the liquid crystal panels 31 are combined with one another by the cross dichroic prism 32, and the combined light is outputted as the image light.

The image generator 3 does not necessarily have the configuration described above and can have any other configuration. For example, a light source other than an LED may be used. In a case where a discharge-type lamp, such as an ultrahigh-pressure mercury lamp, is used as the light source, the light from the light source is separated into R light, G light, and B light, for example, by using dichroic mirrors. The spatial light modulator may be a device using a transmissive liquid crystal material or a reflective liquid crystal material. Instead, a digital micromirror device (DMD) can be used as the spatial light modulator.

Figure 2:
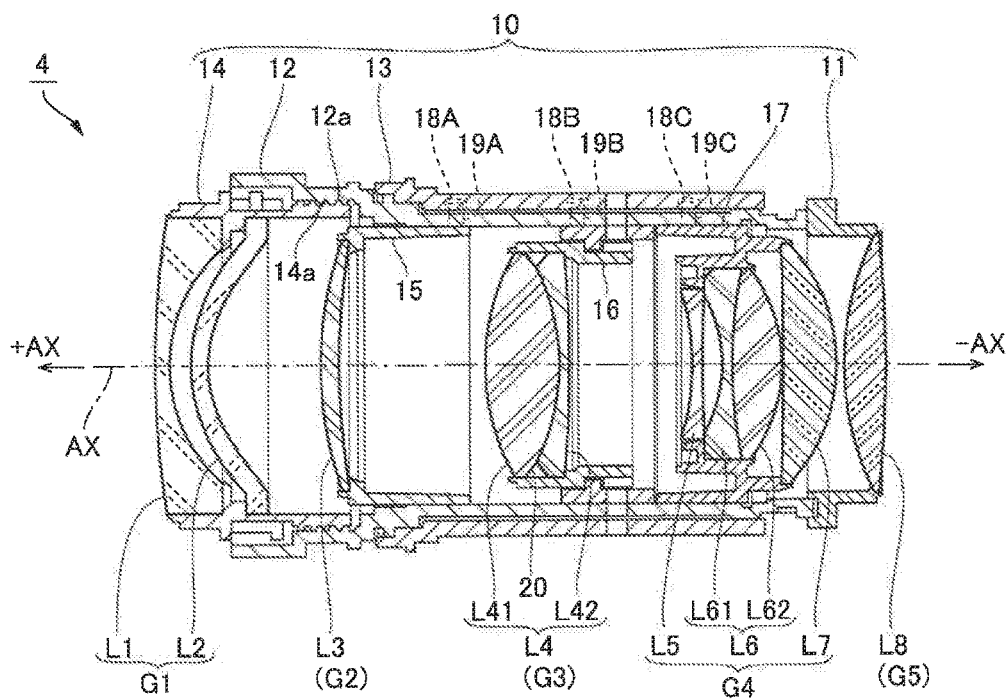
FIG. 2 is a cross-sectional configuration diagram of a projection lens to which the invention is applied.

The projection lens 4 is a lens unit formed of a plurality of lens groups assembled in a lens barrel 10 (see FIG. 2). In the present specification, reference character AX denotes the direction in which the optical axis of the projection lens 4 extends. One side of the optical axis AX is the light exiting side (side facing screen 2), and the other side of the optical axis AX is the light incident side (side facing image generator 3). In the following description, reference character +AX denotes the light exiting side, and reference character −AX denotes the light incident side. The lens barrel 10 of the projection lens 4 has a structure that allows the plurality of lens groups to move along the optical axis AX. The projection lens 4 will be described later in detail. The controller 5 performs a variety of types of control relating to image projection. The controller 5 includes a display controller that controls the image generator 3 on the basis of an externally inputted image signal.

Projection System

Figure 3:
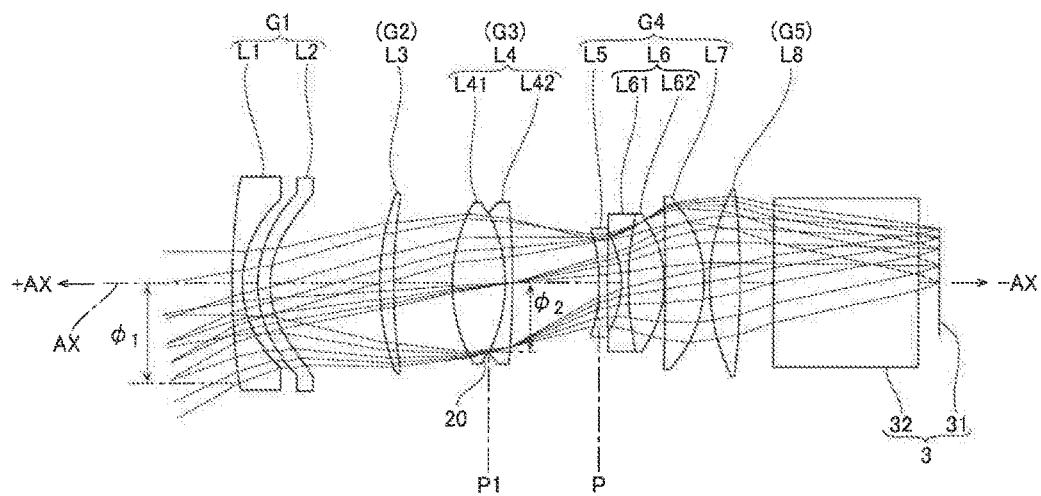
FIG. 3 is a cross-sectional configuration diagram of lens groups that form the projection lens shown in FIG. 2.

FIG. 2 is a cross-sectional configuration diagram of the projection lens 4 to which the invention is applied. FIG. 3 is a cross-sectional configuration diagram of the lens groups that form the projection lens 4 shown in FIG. 2 and describes light rays passing through the projection lens 4. The cross dichroic prism 32 is disposed on the light incident side of the projection lens 4, as shown in FIG. 3. Among the components that form the image generator 3, FIG. 3 shows only the liquid crystal panel 31 for G light and the cross dichroic prism 32.

The projection lens 4 includes a first lens group G1, a second lens group G2, a third lens group G3, a fourth lens group G4, and a fifth lens group G5 arranged along the optical axis AX sequentially from the light exiting side, as shown in FIGS. 2 and 3. Part of the lens groups is formed only of one lens, but a lens group formed only of one lens is also referred to as a "lens group" for convenience in the present specification. The lens groups are held by the lens barrel 10 shown in FIG. 2.

The lens barrel 10 includes a fixed frame 11, which holds the fifth lens group G5, a guide barrel 12, which is attached to the fixed frame 11, a cam barrel 13, and a focusing barrel 14, and three lens frames 15, 16, and 17 are so assembled in the guide barrel 12 as to be movable along the optical axis AX. The three lens frames 15, 16, and 17 hold the second lens group G2, the third lens group G3, and the fourth lens group G4, respectively. The focusing barrel 14 holds the first lens group G1.

The cam barrel 13 is so attached to the outer circumference of the guide barrel 12 as to be rotatable relative thereto. Helical cam grooves 18A, 18B, and 18C are formed in the inner circumferential surface of the cam barrel 13. A cam pin 19A is formed on the lens frame 15. A cam pin 19B is formed on the lens frame 16. A cam pin 19C is formed on the lens frame 17. The cam pins 19A, 19B, and 19C pass through grooves (not shown) formed in the guide barrel 12 and extending in parallel to the optical axis AX and are inserted into the cam grooves 18A, 18B, and 18C, respectively. When the cam barrel 13 is rotated relative to the guide barrel 12, the three lens frames 15, 16, and 17 move along the optical axis AX while the positional relationship among the lens frames 15, 16, and 17 specified by the cam grooves 18A, 18B, and 18C is maintained. As a result, the second lens group G2, the third lens group G3, and the fourth lens group G4 move along the optical axis AX while inter-lens-group distances corresponding to the rotational position of the cam barrel 13 relative to the guide barrel 12 are maintained.

The fixed frame 11 is fixed to the end of the guide barrel 12 on the light incident side −AX. The fifth lens group G5, which is held by the fixed frame 11, does therefore not move. On the other hand, a threaded groove 14a is formed on the outer circumferential surface of the focusing barrel 14, which holds the first lens group G1, and engages with a threaded groove 12a formed on the inner circumferential surface of an end portion of the guide barrel 12 on the light exiting side +AX. Therefore, when the focusing barrel 14 is rotated relative to the guide barrel 12, the first lens group G1 moves along the optical axis AX.

In the projection lens 4, to perform zooming, that is, to change the magnification factor, the second lens group G2, the third lens group G3, and the fourth lens group G4 are moved along the optical axis AX with the first lens group G1 and the fifth lens group G5 fixed on the optical axis AX. To change the magnification factor from the value at the wide angle end to the value at the telephoto end, the second lens group G2, the third lens group G3, and the fourth lens group G4 are gradually moved toward the light exiting side +AX with the inter-lens-group distances changed. Conversely, to change the magnification factor from the value at the telephoto end to the value at the wide angle end, the second lens group G2, the third lens group G3, and the fourth lens group G4 are gradually moved toward the light incident side −AX with the inter-lens-group distances changed. In a case where the distance to the screen 2 changes, focusing is performed by moving the first lens group G1 along the optical axis AX.

The first lens group G1 is a lens group having negative power and formed of two lenses, a first lens L1, which has a convex surface on the light exiting side +AX, and a second lens L2, which has aspheric surfaces on both sides with the light-exiting-side surface being a convex surface, sequentially arranged from the light exiting side +AX. The second lens group G2 is formed only of a third lens L3, which has a convex surface on the light exiting side +AX and has positive power. The third lens group G3 is formed only of a fourth lens L4, which is a biconvex lens and has positive power. The fourth lens L4 is a cemented lens formed of a biconvex lens L41, which is disposed on the light exiting side +AX, and a lens L42, which is disposed on the light incident side −AX and has a convex surface on the light incident side −AX. The fourth lens group G4 is a lens group having positive power and formed of a fifth lens L5, which is a biconcave lens, sixth lens L6, which is a concave surface on the light exiting side +AX and a convex surface on the light incident side −AX, and a seventh lens L7, which has a convex surface on the light incident side −AX, sequentially arranged from the light exiting side +AX. Among the lenses that form the fourth lens group G4, the central sixth lens L6 is a cemented lens formed of a biconcave lens L61, which is disposed on the light exiting side +AX, and a biconvex lens L62, which is disposed on the light incident side −AX. The fifth lens group G5 is formed only of an eighth lens L8, which is a biconvex lens and has positive power.

In the projection lens 4, it is assumed that an effective diameter is the maximum of the light ray passage ranges of the lens surfaces, and that a minimum diameter position P is the on-optical-axis position where the effective diameter is minimized, as shown in FIG. 3. In the present embodiment, the minimum diameter position P is the position of the light-exiting-side or +AX-side lens surface of the fifth lens L5, which is provided in the fourth lens group G4 and closest to the light exiting side +AX. Further, in the projection lens 4 of the present embodiment, the position where the on-axis light flux diameter is minimized is a position shifted from the minimum diameter position P toward the light exiting side. More specifically, the position where the on-axis light flux diameter is minimized is a position between the fourth lens group G4 and the third lens group G3. That is, in the present embodiment, the light-exiting-side on-axis light flux diameter is smaller than the minimum effective diameter (effective diameter at the light-exiting-side or +AX-side lens surface of the fifth lens L5, which is the lens surface in the minimum diameter position P).

In the projection lens 4, one of the lenses (specific lens) shifted from the minimum diameter position P toward the light exiting side +AX is provided with a stop 20, which controls the on-axis light flux diameter. The specific lens provided with the stop 20 is a lens that satisfies the following Expression (1).

$$0.8\varphi_1 \leq \varphi_2 \leq \varphi_1 \qquad \text{Expression (1)}$$

In Expression (1), $\varphi_1$ represents the light flux diameter on a surface where the on-axis light flux diameter is maximized (that is, light flux diameter on a lens surface located where the on-axis light flux diameter is maximized), and $\varphi_2$ is the diameter of the stop 20 (see FIG. 3). The lens provided with the step 20 is a lens having a diameter and located in a position that allow Expression (1) to be satisfied. In the present embodiment, the fourth lens L4, which is one of the lenses shifted from the minimum diameter position P toward the light exiting side +AX and is the lens closest to the minimum diameter position P, satisfies the condition expressed by Expression (1). The fourth lens L4 therefore is provided with the stop 20. In FIG. 3, reference character P1 denotes the position of the stop 20.

When Expression (1) is satisfied, the stop 20 is provided, among the lenses shifted from the minimum diameter position P toward the light exiting side, on a lens located in a position where the light flux diameter is large. As a result, heat dissipation capability can be increased, and a situation in which the stop and components therearound are heated to high temperatures can therefore be avoided.

Stop

The stop 20 is formed on the fourth lens L4, as shown in FIGS. 2 and 3. The fourth lens L4 has a light scattering rough surface 21, which is part of a surface facing in the direction that intersects the optical axis AX. The rough surface 21 is provided along an outer circumferential edge of the fourth lens L4. The rough surface 21, which is formed along an outer circumferential edge of the fourth lens L4, is allowed to function as the stop 20. The rough surface 21 is a region where fine irregularities that scatter light incident thereon are formed on the surface of a lens base material constituting the fourth lens L4. A surface having such an irregular shape is called a "ground surface" in some cases. The fourth lens L4 is made of a transparent lens material, such as a resin and a glass material. The irregular shape of the rough surface 21 may be formed by shape transfer from a die, or formed in a physical process, such as a laser blasting process, a chemical process, such as an etching process, or any other method other than those described above.

Figure 4:
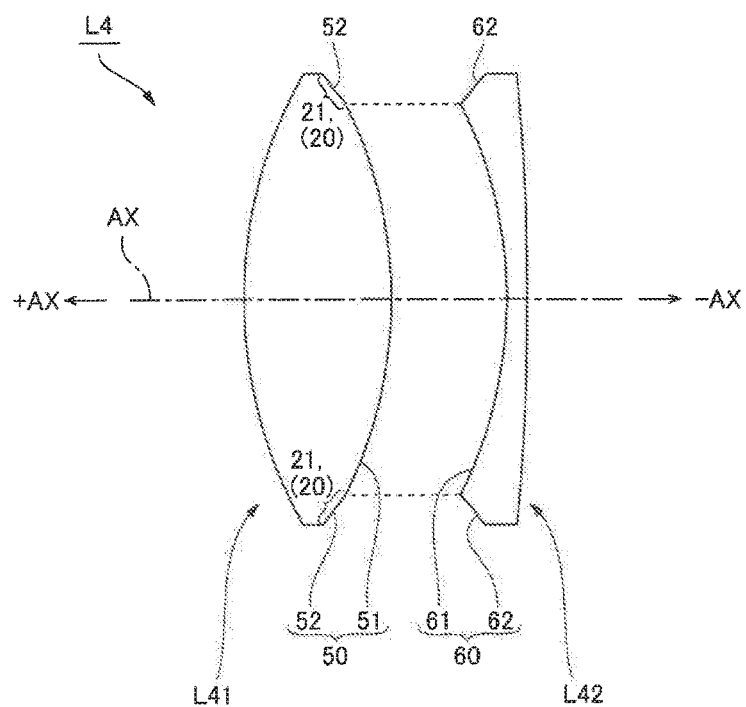
FIG. 4 is an exploded view of a lens on which a stop is provided.
Figure 5:
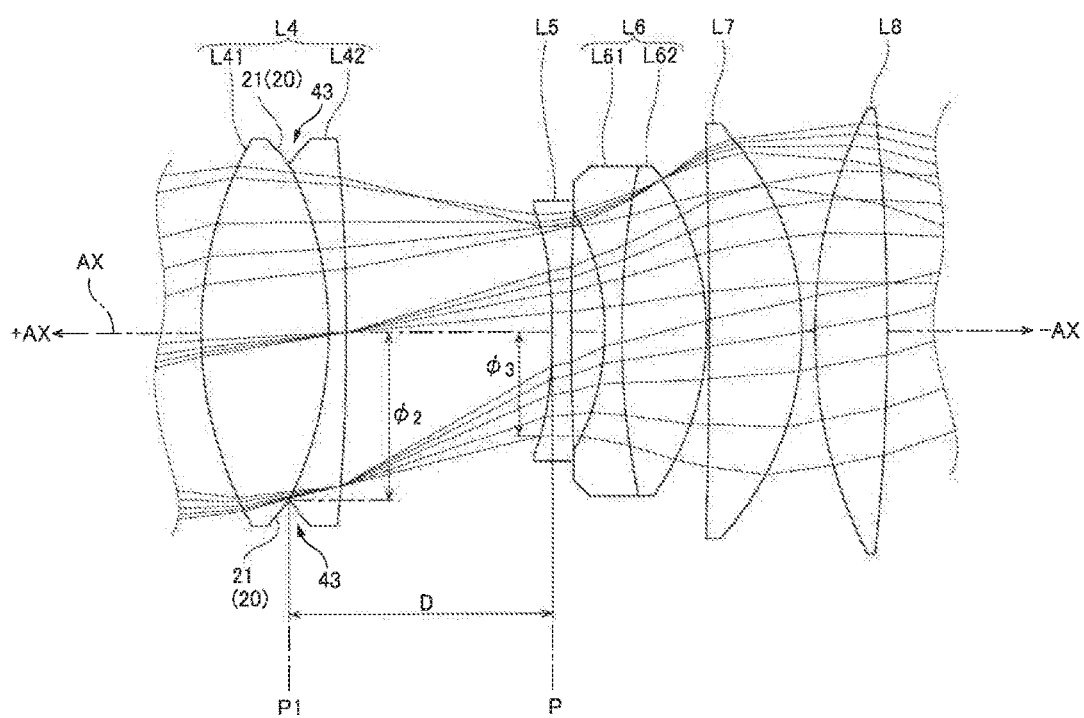
FIG. 5 is a cross-sectional configuration diagram of lens groups located in the vicinity of a minimum diameter position and the stop.

FIG. 4 is an exploded view of the lens on which the stop 20 is provided. FIG. 5 is a cross-sectional configuration diagram of the lens groups located in the vicinity of the minimum diameter position and the stop 20. The fourth lens L4 is a cemented lens, and the lens L41, which is located on the light exiting side +AX, and the lens L42, which is located on the light incident side −AX, are bonded to each other with an adhesive. A transparent resin made, for example, of an epoxy resin or balsam is used as the adhesive that bonds the lens L41 and the lens L42 to each other.

The lens L41 has a first bonding surface 50, which faces the lens L42 (that is, light incident side −AX), as shown in FIG. 4. The first bonding surface 50 is a convex surface. The first bonding surface 50 has a circular first bonding region 51, which is formed around the optical axis AX, and an outer circumferential region 52, which extends outward from the circumference of the first bonding region 51. The outer circumferential region 52 is a tapered surface formed around the optical axis AX, and the entire outer circumferential region 52 serves as the rough surface 21. The first bonding surface 50 is a non-smoothly-continuous surface that bends at the boundary between the first bonding region 51 and the outer circumferential region 52 (rough surface 21). That is, since the first bonding region 51 is a convex curved surface, and the outer circumferential region 52 (rough surface 21) is a tapered surface, the first bonding region 51 and the outer circumferential region 52 (rough surface 21) are connected to each other in a non-continuously smooth manner. The boundary between the first bonding region 51 and the outer circumferential region 52 (rough surface 21) is the inner circumferential edge of the stop 20. The outer circumferential region 52 (rough surface 21) may incline with respect to the optical axis AX by an angle different from the angle shown in FIG. 4.

The lens 42 has a second bonding surface 60, which faces the lens L41 (that is, light exiting side +AX). The second bonding surface 60 is a concave surface. The second bonding surface 60 has a circular second bonding region 61, which is formed around the optical axis AX, and an outer circumferential region 62, which extends outward from the circumference of the second bonding region 61. The outer circumferential region 62 is a tapered surface formed around the optical axis AX. The outer circumferential region 62 is a chamfered surface formed by chamfering an outer circumferential portion of the second bonding surface 60. The fourth lens L4 is formed by aligning the optical axes of the lens L41 and the lens L42 with each other and bonding the first bonding region 51 of the first bonding surface 50 to the second bonding region 61 of the second bonding surface 60 to each other via the adhesive.

When the lens L41 and the lens L42 are bonded to each other, the outer circumferential region 52 (rough surface 21) of the first bonding surface 50 and the outer circumferential region 62 of the second bonding surface 60 form a groove 43 (see FIG. 5). The groove 43 is formed along the entire circumference of the fourth lens L4. The outer circumferential regions 52 and 62 form the inner circumferential surface of the groove 43. The outer circumferential region 52 (rough surface 21) is a tapered surface facing the light incident side −AX, and the outer circumferential region 62 is a tapered surface facing the light exiting side +AX. The two tapered surfaces incline in opposite directions with respect to a plane perpendicular to the optical axis AX and are connected to each other at the bottom of the groove 43. That is, the stop 20 is provided on the light-incident-side or −AX-side surface of the inner circumferential surface of the groove 43, which opens toward the outer circumferential surface of the fourth lens L4.

Now, let $\varphi_3$ be the light flux diameter in the minimum diameter position P in the projection lens 4, as shown in FIG.

5. The stop 20 has the diameter $\varphi_2$, as described above. The light flux diameter $\varphi_3$ in the minimum diameter position P means the height of the on-axis light flux (light flux corresponding to angle of view of zero) in the minimum diameter position P from the optical axis AX. Further, the diameter $\varphi_2$ of the stop 20 means the distance from the optical axis AX of the inner circumferential edge of the rough surface 21. In the present embodiment, the diameter $\varphi_2$ of the stop 20 is so specified as to satisfy the following Expression (2).

$$\varphi_2 \geq 1.2\varphi_3 \quad \text{Expression (2)}$$

When Expression (2) is satisfied, the stop 20 controls the amount of light having a light flux diameter greater than the light flux diameter in the minimum diameter position P, and the lens on which the stop 20 is provided and the lens frame that holds the lens are therefore unlikely to be heated to high temperatures. When Expression (2) is satisfied, the stop 20 is provided in a position where the light flux diameter of the on-axis light flux is expanded by a factor of at least 1.2, and the area of the stop 20 on which the blocked light is incident is increased roughly by a factor of at least two, and the amount of heat incident on a unit area therefore decreases to a half or less. Therefore, the possibility of a decrease in lens performance and damage of the lens frame and other components due to high temperatures decreases.

Further, let D be the distance between the minimum diameter position P and the stop 20 along the optical axis AX, as shown in FIG. 5. In the present embodiment, the position P1 of the stop 20 is so specified as to satisfy the following Expression (3).

$$D \geq \varphi_3 \quad \text{Expression (3)}$$

When Expression (3) is satisfied, the stop 20 is disposed in a position remote from the minimum diameter position P, and the stop 20 therefore controls the region through which light having a light flux diameter greater than that in the minimum diameter position P passes. The lens on which the stop 20 is provided and the lens frame that holds the lens are therefore unlikely to be heated to high temperatures, whereby the possibility of a decrease in lens performance and damage of the lens frame and other components due to high temperatures decreases.

Specific Example of Projection Lens

Tables 1 and 2 show lens data and other pieces of information on a specific example of the projection lens 4. In Table 1, the "Surface number" represents numbers assigned to the surfaces of the lenses sequentially arranged from the light exiting side +AX. "R" represents the radius of curvature, and "D" represents the distance to the following surface. Further, "Nd" represents the refractive index of the lens material at the d line, and "vd" represents the Abbe number of the lens material at the d line. In the field labeled with "D", the distances D4, D6, D9, and D17 each represents a variable length (distance that changes when zooming is performed).

TABLE 1

| Surface number | R | D | Nd | Nv |
|---|---|---|---|---|
| 0 | | 1800.000 | | |
| 1 | 125.905 | 1.800 | 1.69680 | 55.46 |
| 2 | 20.354 | 2.800 | | |
| 3* | 21.500 | 2.200 | 1.53116 | 56.05 |
| 4* | 15.924 | D4 (Variable distance) | | |
| 5 | 48.698 | 2.400 | 1.80518 | 25.46 |
| 6 | 99.185 | D6 (Variable distance) | | |
| 7 | 29.785 | 9.500 | 1.74400 | 44.90 |
| 8 | −28.405 | 1.300 | 1.80610 | 33.27 |
| 9 | −160.096 | D9 (Variable distance) | | |
| Stop | ∞ | 2.000 | | |
| 11* | −41.932 | 1.400 | 1.83400 | 37.35 |
| 12 | 279.293 | 2.470 | | |
| 13 | −18.688 | 1.300 | 1.80518 | 25.46 |
| 14 | 62.475 | 6.300 | 1.48749 | 70.44 |
| 15 | −21.319 | 0.200 | | |
| 16 | −491.272 | 6.880 | 1.69680 | 55.46 |
| 17 | −23.102 | D17 (Variable distance) | | |
| 18 | 37.982 | 5.400 | 1.58913 | 61.25 |
| 19 | −153.553 | 6.000 | | |
| 20 | ∞ | 25.750 | 1.51680 | 64.20 |
| 21 | ∞ | 3.350 | | |

TABLE 2

| ASP | K | A04 | A06 | A08 | A10 | A12 |
|---|---|---|---|---|---|---|
| R 3 | 0.00000E+00 | 2.06533E−06 | −4.51412E−08 | 0.00000E+00 | 0.00000E+00 | 0.00000E+00 |
| R 4 | −5.14320E−01 | −1.10028E−05 | −8.14152E−08 | −1.18979E−12 | −7.39028E−15 | 0.00000E+00 |
| R11 | 7.24569E−01 | −3.98807E−05 | −9.86541E−08 | 2.34401E−10 | 0.00000E+00 | 0.00000E+00 |

Lenses L1 to L8 in the specific example are each basically a spherical lens, but the light-incident surface and the light-exiting surface of the second lens L2 (third and fourth surfaces in Table 1) and the light-incident surface of the fifth lens L5 (eleventh surface in Table 1) are each an aspheric surface, as described above. Each aspheric surface shape in the projection lens 4 in the specific example is expressed by the following expression.

$$x = \frac{c \cdot h^2}{1 + \sqrt{1 - (1+k) \cdot c^2 \cdot h^2}} + A04 \cdot h^4 + A06 \cdot h^6 + A08 \cdot h^8 + A10 \cdot h^{10} + A12 \cdot h^{12}$$

In the aspheric surface expression described above, x represents the amount of displacement from the vertex of the surface along the optical axis AX, c represents the reciprocal of the radius of paraxial curvature, h represents the height from the optical axis AX, k represents the conic constant, and A04, A06, A08, A10, and A12 are high-order aspheric surface coefficients. Table 2 shows the values of the conic constant k and the high-order aspheric surface coefficients A04, A06, A08, A10, and A12.

Figure 6:
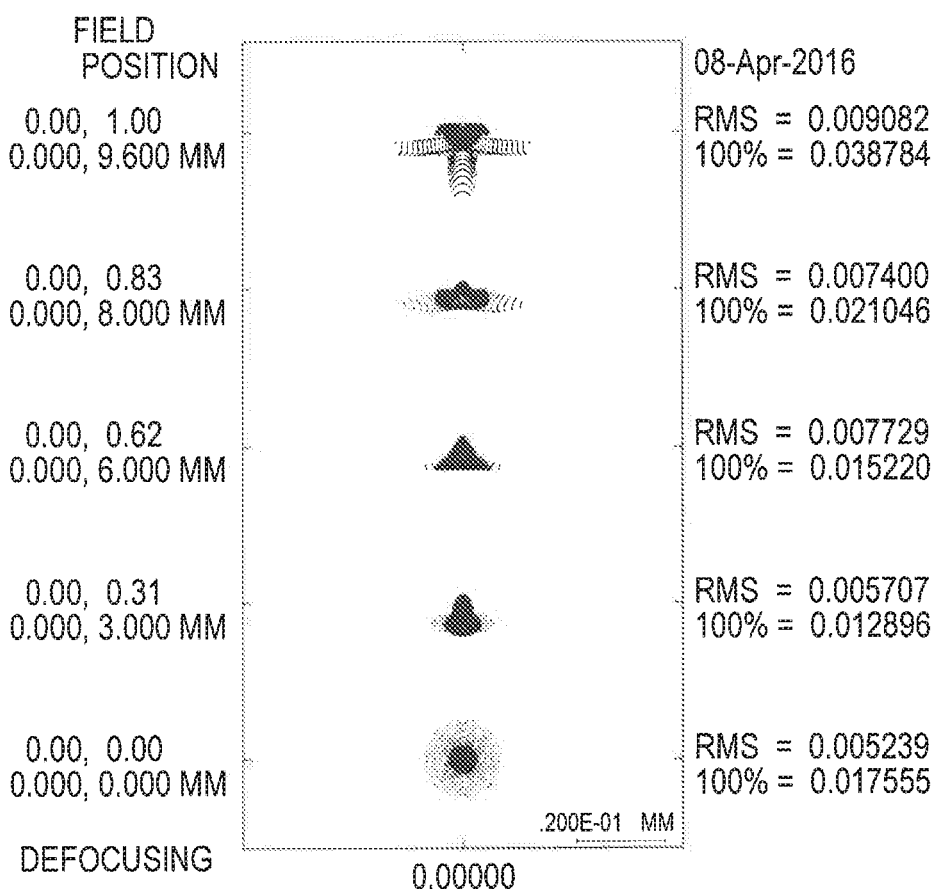
FIG. 6 is a spot diagram showing spots produced by a projection lens of a specific example for each angle of view.
Figure 9:
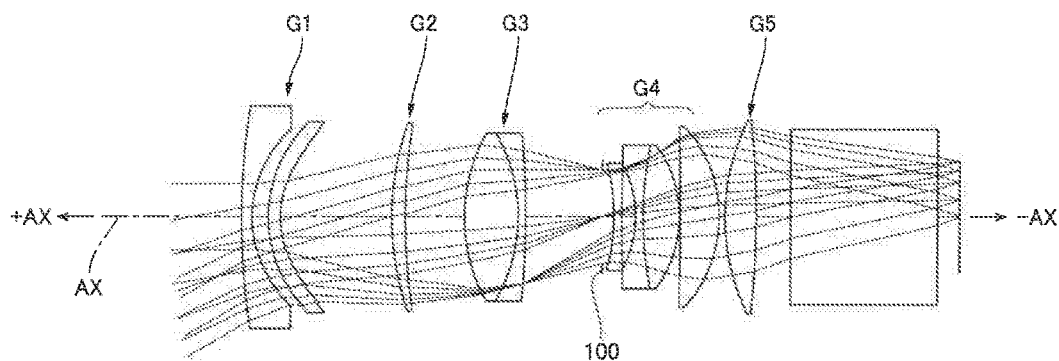
FIG. 9 is a cross-sectional configuration diagram of a projection lens of related art.
Figure 10:
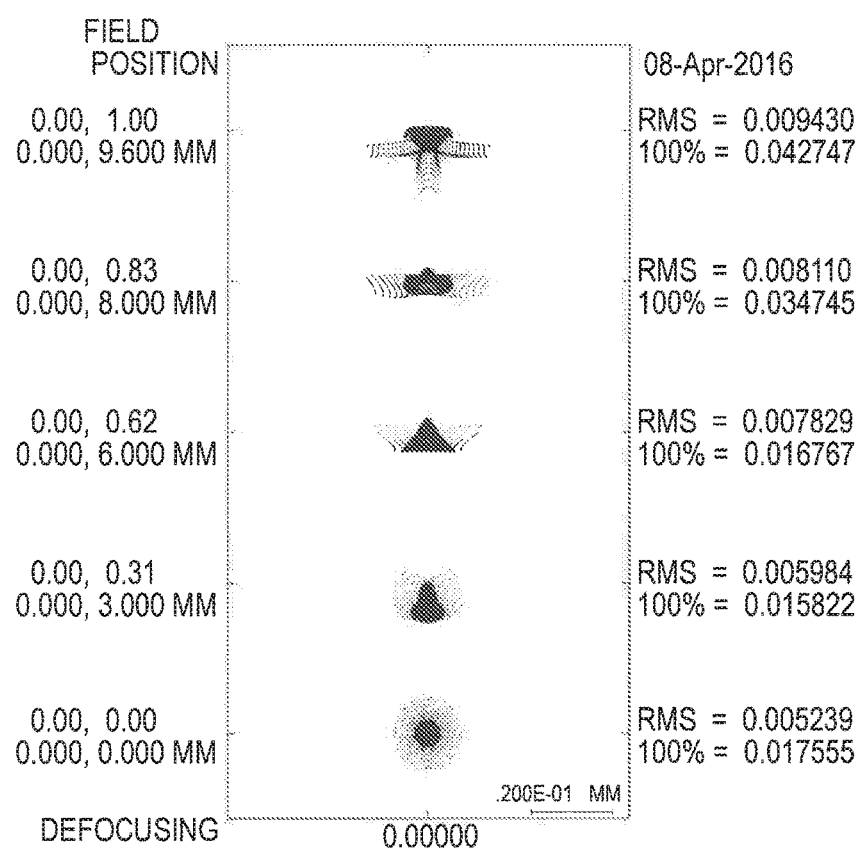
FIG. 10 is a spot diagram showing spots produced by the projection lens of related art for each angle of view.

FIG. 6 is a spot diagram showing spots produced by the projection lens of the specific example for each angle of view. FIG. 10 is a spot diagram showing spots produced by the projection lens of related art shown in FIG. 9 for each angle of view. The projection lens of the specific example (see FIG. 3), to which the invention is applied, differs from the projection lens of related art (see FIG. 9) in that a stop that is a member separate from a lens is provided in the minimum diameter position P in the relate art, whereas in the projection lens 4 of the specific example, to which the invention is applied, the rough surface 21, which is formed on the fourth lens L4, is used as the stop 20. The projection lens 4 of the specific example, to which the present embodiment is applied, provides an optical image more satisfactory than that provided by the projection lens 4 of related art primarily in low-viewing-angle positions, as seen from FIGS. 6 and 10.

Primary Advantageous Effects of Present Embodiment

As described above, the projection lens 4 of the present embodiment includes a plurality of lenses arranged along the optical axis AX. In the projection lens 4, when it is assumed that the effective diameter is the maximum of the light ray passage ranges of the surfaces (lens surfaces), and that the minimum diameter position P is the position on the optical axis AX where the effective diameter is minimized, the stop 20 is formed along the outer circumferential edge of the specific lens located not only in a position shifted from the minimum diameter position P toward the light exiting side +AX and but also in a position where the light flux is expanded to some extent. The specific lens located in a position where the light flux is expanded to some extent is a lens located in a position and having a diameter that allow the diameter $\varphi_2$ of the stop to be a value 0.8 to 1.0 times the light flux diameter $\varphi_1$ in a plane where the on-axis light flux diameter is maximized. For example, in the present embodiment, the fourth lens L4, which is shifted from the minimum diameter position P toward the light exiting side +AX and is closest to the minimum diameter position P, is the lens that satisfies the condition described above. Providing the stop 20 at a location where the light flux is expanded to some extent as described above allows heat dissipation capability to increase to prevent the stop 20 and components therearound from being heated to high temperatures. Therefore, high temperatures are not likely to occur in the position where the light converges or the position of the stop 20, whereby the possibility of a decrease in lens performance and damage of the lens frame and other components due to high temperatures decreases. Further, no heat-resistant member needs to be used. Therefore, in the projection lens 4 including the stop 20, which controls the amount of light and passage of off-axis light rays, a decrease in lens performance due to a high temperature can be suppressed, and cost reduction can be achieved.

In the present embodiment, the fourth lens L4 has the stop 20 formed along the outer circumferential edge thereof. The stop 20 can serve both as an aperture stop that controls the amount of light to be projected and as a fixed stop that controls off-axis light rays. As described above, providing the lens itself with a portion that functions as the stop 20 eliminates the need to use a stop formed of a separate member. Further, since high temperature will not be likely to occur in the position where light converges or in the position of the stop 20, the possibility of a decrease in lens performance and damage of the lens frame and other components due to high temperatures decreases. Further, no heat-resistant member needs to be used. Therefore, in the projection lens 4 including the stop 20, which controls the amount of light and passage of off-axis light rays, a decrease in lens performance due to a high temperature can be suppressed, and cost reduction can be achieved.

The stop 20 in the present embodiment is the rough surface 21 provided on the surface of the lens base material constituting the fourth lens L4, such as a resin and a glass material. Since light incident on the rough surface 21 is diffused, the amount of light that passes through the step 20 can be controlled. The stop 20 can therefore be provided by using a simple structure. Further, since the light is diffused, an increase in the temperature due to absorption of the light can be reduced. The possibility of a decrease in lens performance and damage of the lens frame and other components due to high temperatures therefore decreases.

In the present embodiment, the fourth lens L4, on which the stop 20 is provided, is a cemented lens formed of the lens L41 and the lens L42 bonded to each other. The lens L41, which is one of the lenses, has the first bonding surface 50, which faces the lens L42, which is the other lens, and the first bonding surface 50 has the first bonding region 51, which is bonded to the lens L42. The tapered, chamfered surface formed on the outer circumferential side of the first bonding region 51 is so converted into the rough surface 21 as to function as the stop 20. The stop 20 can thus be provided by using the bonding surface of one of the lenses that form the cemented lens. In this case, the stop 20 can be formed when the bonding surfaces are processed, whereby the stop 20 can be readily formed.

In the present embodiment, the first bonding region 51 is a non-smoothly-continuous surface portion that bends at the boundary between the first bonding region 51 and the rough surface 21. In this configuration, since the boundary between the first bonding region 51 and the rough surface 21 determines the diameter of the stop, the possibility of variation in the diameter of the stop, due to a decrease in positional precision of the lenses L41 and L42 bonded to each other, decreases.

In the present embodiment, the lens L42, which is bonded to the lens L41, on which the stop 20 is provided, has the second bonding surface 60, and the second bonding surface 60 has a tapered, chamfered surface, which is a portion outside the second bonding region 61, which is bonded to the first bonding region 51. In this configuration, a groove-shaped gap is formed along the outer circumferential edge of the fourth lens L4, which is a cemented lens. The rough surface 21, which functions as the stop 20, can therefore be provided on the inner circumferential surface of the gap (groove 43).

In the present embodiment, the light flux diameter $\varphi_3$ in the minimum diameter position in the projection lens 4 satisfies $\varphi_2 \geq 1.2\varphi_3$. Further, the light flux diameter $\varphi_3$ in the minimum diameter position in the projection lens 4 and the distance D along the optical axis between the minimum diameter position and the stop satisfy $D \geq \varphi_3$. In this configuration, since the stop 20 is disposed in a position which is remote from the minimum diameter position P and where the light is expanded by a greater amount than in the minimum diameter position P, the lens on which the stop 20 is provided and the lens frame that holds the lens are unlikely to be heated to high temperatures. The possibility of a decrease in lens performance and damage of the lens frame and other components due to high temperatures therefore decreases.

The projector 1 according to the present embodiment includes the projection lens 4 including the stop 20, which can serve both as an aperture stop that controls the amount of light to be projected and as a fixed stop that controls off-axis light rays, and capable of preventing a decrease in lens performance due to a high temperature. The projector 1 can therefore suppress a decrease in quality of a projected image and the like and can achieve reduction in the number of members of the projection lens 4 and cost reduction thereof.

Variation 1

Figure 7:
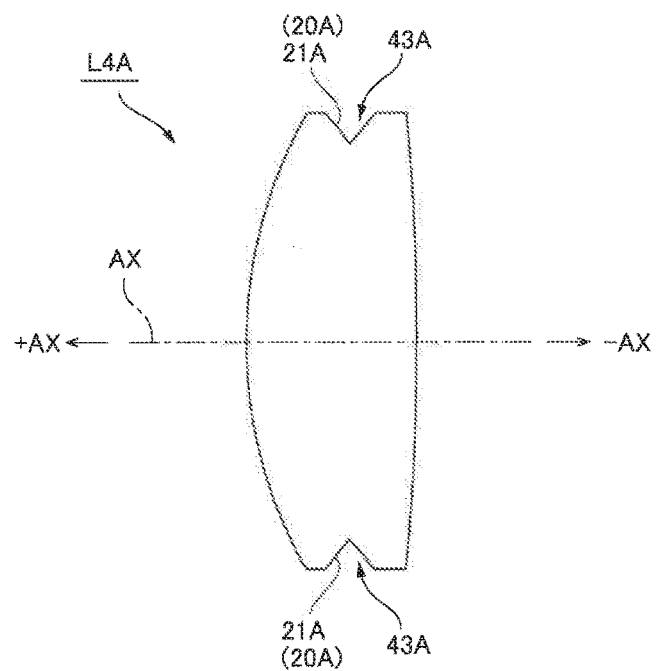
FIG. 7 is a cross-sectional view of a lens provided with a stop of Variation 1.

FIG. 7 is a cross-sectional configuration diagram of a lens provided with a stop of Variation 1. In Variation 1, a fourth lens L4A shown in FIG. 7 is used in place of the fourth lens L4 in the embodiment described above. The fourth lens L4A is formed only of one lens that is not a cemented lens. The fourth lens L4A has the same outer shape as that of the fourth lens L4 in the embodiment described above, and a groove 43A having the same shape of the groove 43 in the embodiment described above is formed in the outer circumferential surface of the fourth lens L4A. The inner circumferential surface of the groove 43A has the same shape formed by the outer circumferential regions 52 and 62 in the embodiment described above.

The fourth lens L4A in Variation 1 is so shaped that the inner circumferential surface of the groove 43A has a tapered surface facing the light incident side −AX, and that the tapered surface forms a rough surface 21A, which functions as a stop 20A. Converting the inner circumferential surface of the groove 43A, which is formed in the outer circumferential surface of the fourth lens L4A, as described above allows the stop 20A to be provided even on a lens that is not a cemented lens. The inclination angle of the tapered surface converted into the rough surface 21 with respect to the optical axis AX may differ from the angle shown in FIG. 7, as in the embodiment described above.

Variation 2

Figure 8:
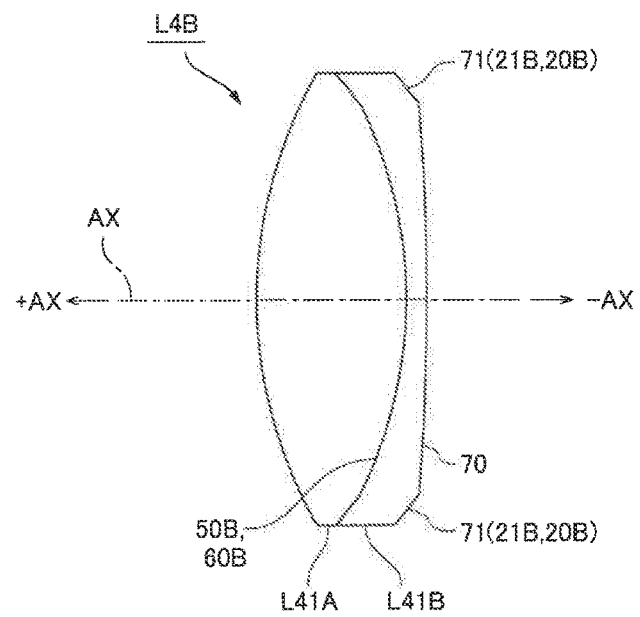
FIG. 8 is a cross-sectional view of a lens provided with a stop of Variation 2.

FIG. 8 is a cross-sectional configuration diagram of a lens provided with a stop of Variation 2. In Variation 2, a fourth lens L4B shown in FIG. 8 is used in place of the fourth lens L4 in the embodiment described above. The fourth lens L4B is a cemented lens formed of a lens L41A, which is a biconvex lens disposed on the light exiting side +AX, and a lens L41B, which is disposed on the light incident side −AX and has a convex surface on the light incident side −AX. The lens 41A has a first bonding surface 50B facing the lens L41B (that is, light incident side −AX), and the entire region of the first bonding surface 50B forms a bonding region to be bonded to the lens L41B. Similarly, the lens L41B has a second bonding surface 60B facing the lens L41A (that is, light exiting side +AX), and the entire region of the second bonding surface 60B forms the bonding region.

The lens L42B has a lens surface 70 facing the light incident side −AX. An outer circumferential portion of the lens surface 70 is so chamfered as to form a tapered surface 71, which is formed around the optical axis AX. The tapered surface 71 forms a rough surface 21B, which functions as a stop 20B. The stop 20B can also be provided on a surface different from the bonding surfaces of the lenses that form the cemented lens, as described above.

In Variations 1 and 2 described above, it is desirable to satisfy $0.8\varphi_1 \leq \varphi_2 \varphi \varphi_1$, $\varphi_2 \geq 1.2\varphi_3$, and $D \geq \varphi_3$, as in the embodiment described above. The same advantageous effects provided by the embodiment described above can therefore be provided.

Variation 3

In the embodiment described above, the stop 20 is provided on the lens L41, which is located on the light exiting side +AX, out of the two lenses that form the fourth lens L4. The stop 20 can instead be provided on the lens L42 by converting the outer circumferential region 62 of the second bonding surface 60 of the lens L42, which is located on the light incident side −AX, into a rough surface.

The entire disclosure of Japanese Patent Application No. 2016-115968, filed Jun. 10, 2016 is expressly incorporated by reference herein.

What is claimed is:

1. A projection lens comprising a plurality of lenses arranged along an optical axis,
wherein when it is assumed that a side where light exits from the projection lens is a light exiting side, that a side opposite the light exiting side is a light incident side, that a maximum of light ray passage ranges of lens surfaces is an effective diameter, and that an on-optical-axis position of a surface where the effective diameter is minimized is a minimum diameter position,
an on-axis light flux diameter on the light exiting side is smaller than the minimum effective diameter, and
a stop that controls the on-axis light flux diameter is formed along an outer circumferential edge of a specific lens that satisfies the following expression (1):

$$0.8\varphi_1 \leq \varphi_2 \leq \varphi_1 \qquad \text{Expression (1)}$$

where $\varphi_1$ represents a light flux diameter on a surface where the on-axis light flux diameter is maximized, and $\varphi_2$ is the diameter of the stop that controls the on-axis light flux passing through a lens shifted from the minimum diameter position toward the light exiting side.

2. The projection lens according to claim 1, wherein the stop is a rough surface formed on a surface of a lens base material constituting the specific lens.

3. The projection lens according to claim 2,
wherein the specific lens is a cemented lens formed of a lens located on the light exiting side and a lens located on the light incident side with the two lenses bonded to each other,
one of the lens located on the light exiting side and the lens located on the light incident side has a first bonding surface facing the other lens,
the first bonding surface has a first bonding region bonded to the other lens, and
the rough surface is provided in an outer circumferential region that surrounds the first bonding region of the first bonding surface.

4. The projection lens according to claim 3,
wherein the first bonding surface is a non-smoothly-continuous surface that bends at a boundary of the first bonding region and the rough surface.

5. The projection lens according to claim 2,
wherein a groove that is recessed toward an inner circumference of the specific lens is formed along an entire circumference of an outer circumferential surface of the specific lens, and
the rough surface is provided on an inner circumferential surface of the groove.

6. The projection lens according to claim 1,
wherein the following Expression (2) is satisfied:

$$\varphi_2 \geq 1.2\varphi_3 \qquad \text{Expression (2)}$$

where $\varphi_3$ represents the light flux diameter in the minimum diameter position.

7. The projection lens according to claim 1,
wherein the following Expression (3) is satisfied:

$$D \geq \varphi_3 \qquad \text{Expression (3)}$$

where $\varphi_3$ represents the light flux diameter in the minimum diameter position, and D represents a distance between the minimum diameter position and the stop along the optical axis.

8. A projector comprising:
the projection lens according to claim 1; and
an image generator that generates image light incident on the projection lens.

9. A projector comprising:
the projection lens according to claim 2; and
an image generator that generates image light incident on the projection lens.

10. A projector comprising:
the projection lens according to claim 3; and
an image generator that generates image light incident on the projection lens.

11. A projector comprising:
the projection lens according to claim 4; and
an image generator that generates image light incident on the projection lens.

12. A projector comprising:
the projection lens according to claim 5; and
an image generator that generates image light incident on the projection lens.

13. A projector comprising:
the projection lens according to claim 6; and
an image generator that generates image light incident on the projection lens.

14. A projector comprising:
the projection lens according to claim 7; and
an image generator that generates image light incident on the projection lens.

* * * * *